US011977813B2

(12) United States Patent
Kwatra et al.

(10) Patent No.: US 11,977,813 B2
(45) Date of Patent: May 7, 2024

(54) DYNAMICALLY MANAGING SOUNDS IN A CHATBOT ENVIRONMENT

(71) Applicant: INTERNATIONAL BUSINESS MACHINES CORPORATION, Armonk, NY (US)

(72) Inventors: Shikhar Kwatra, San Jose, CA (US); Jeremy R. Fox, Georgetown, TX (US); Paul N. Krystek, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/248,153

(22) Filed: Jan. 12, 2021

(65) Prior Publication Data
US 2022/0222034 A1 Jul. 14, 2022

(51) Int. Cl.
*G06F 3/16* (2006.01)
*G06F 18/24* (2023.01)
*G06N 20/00* (2019.01)
*H04L 51/02* (2022.01)

(52) U.S. Cl.
CPC ............. *G06F 3/165* (2013.01); *G06F 18/24* (2023.01); *G06N 20/00* (2019.01); *H04L 51/02* (2013.01)

(58) Field of Classification Search
CPC ...... G06F 3/165; G06K 9/6267; G06N 20/00; H04L 51/02
See application file for complete search history.

(56) References Cited

U.S. PATENT DOCUMENTS

| 6,675,002 | B1 | 1/2004 | Lipovski |
| 8,903,721 | B1 | 12/2014 | Cowan |
| 10,691,737 | B2* | 6/2020 | Parikh ................... G06F 16/345 |
| 2003/0216919 | A1 | 11/2003 | Roushar |
| 2007/0253561 | A1* | 11/2007 | Williams ................ H04S 7/301 600/28 |
| 2008/0091426 | A1 | 4/2008 | Rempel |
| 2012/0221552 | A1 | 8/2012 | Reponen et al. |
| 2013/0166076 | A1 | 6/2013 | Karr |
| 2014/0078404 | A1* | 3/2014 | Cheung ............ H04N 21/42203 348/734 |
| 2014/0079225 | A1 | 3/2014 | Jarske |
| 2014/0314261 | A1* | 10/2014 | Selig ................... A61B 5/6898 381/314 |

(Continued)

FOREIGN PATENT DOCUMENTS

WO  2017112496 A  6/2017

OTHER PUBLICATIONS

Mell, et al., "The NIST Definition of Cloud Computing", National Institute of Standards and Technology, Special Publication 800-145, Sep. 2011, 7 pages.

*Primary Examiner* — Phung-Hoang J Nguyen
(74) *Attorney, Agent, or Firm* — Robert D. Bean

(57) ABSTRACT

A method, computer system, and a computer program product for sound management is provided. The present invention may include generating a multidimensional risk vector relating to a current contextual activity of a user. The present invention may include dynamically monitoring at least one sound generating device within a predefined threshold distance of a chatbot of the user. The present invention may include determining that an audio adjustment of the at least one sound generating device is warranted. The present invention may include performing the audio adjustment.

18 Claims, 5 Drawing Sheets

(56) References Cited

U.S. PATENT DOCUMENTS

| | | | |
|---|---|---|---|
| 2016/0162254 A1* | 6/2016 | Benattar | G10K 11/17837 |
| | | | 700/94 |
| 2016/0203828 A1* | 7/2016 | Gomez | G10L 15/20 |
| | | | 704/226 |
| 2016/0234595 A1* | 8/2016 | Goran | H04L 12/2827 |
| 2017/0011750 A1* | 1/2017 | Liu | G10L 19/022 |
| 2018/0242098 A1* | 8/2018 | Pratt | H04S 7/301 |
| 2019/0245503 A1* | 8/2019 | Wardle | H04S 7/301 |
| 2020/0007681 A1* | 1/2020 | Balzer | G06F 16/30 |
| 2020/0159487 A1* | 5/2020 | Dawson | G06F 3/16 |
| 2020/0366991 A1* | 11/2020 | Freeman | H04S 7/30 |
| 2020/0395007 A1* | 12/2020 | Cheng | G06N 20/00 |
| 2021/0335381 A1* | 10/2021 | Park | G10L 13/033 |
| 2023/0083856 A1* | 3/2023 | Lindström | G08B 21/182 |

\* cited by examiner

DYNAMICALLY MANAGING SOUNDS IN A CHATBOT ENVIRONMENT

BACKGROUND

The present invention relates generally to the field of computing, and more particularly to interactive chatbots.

A chatbot may be an artificial intelligence (AI) device designed to simulate conversation with a human user. A user may initialize a chatbot via near field communications (NFC) and may communicate with the chatbot while the chatbot is within range of at least one other sound generating device.

SUMMARY

Embodiments of the present invention disclose a method, computer system, and a computer program product for sound management. The present invention may include generating a multidimensional risk vector relating to a current contextual activity of a user. The present invention may include dynamically monitoring at least one sound generating device within a predefined threshold distance of a chatbot of the user. The present invention may include determining that an audio adjustment of the at least one sound generating device is warranted. The present invention may include performing the audio adjustment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
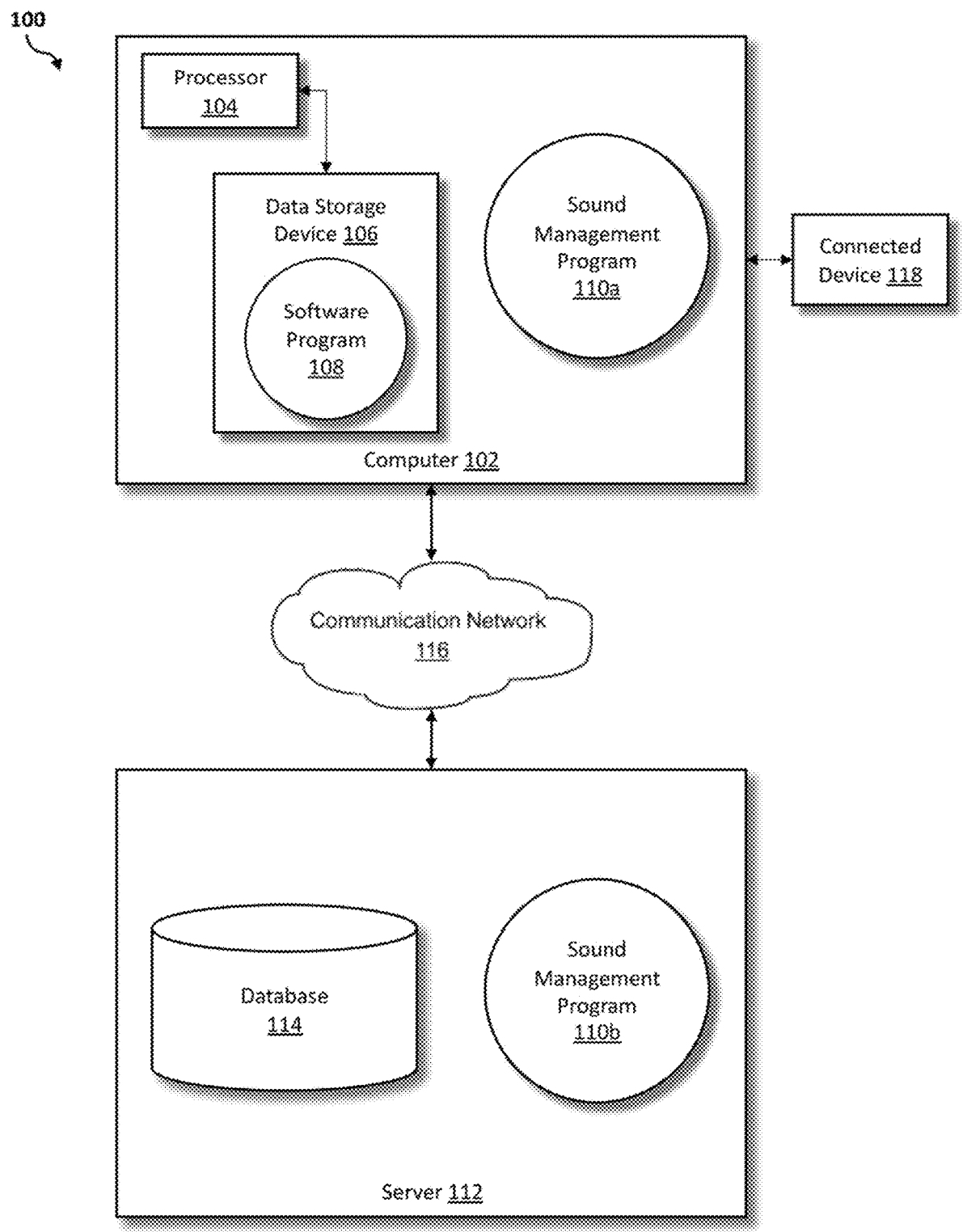
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for sound management. As such, the present embodiment has the capacity to improve the technical field of interactive chatbots by detecting audio interference with a chatbot device and altering the sound generating device producing the interfering audio, as necessary, and for as long as the audio interference exists. More specifically, the present invention may include generating a multidimensional risk vector relating to a current contextual activity of a user. The present invention may include dynamically monitoring at least one sound generating device within a predefined threshold distance of a chatbot of the user. The present invention may include determining that an audio adjustment of the at least one sound generating device is warranted. The present invention may include performing the audio adjustment.

As described previously, a chatbot may be an artificial intelligence (AI) device designed to simulate conversation with a human user. A user may initialize a chatbot via near field communications (NFC) and may communicate with the chatbot while the chatbot is within range of at least one other sound generating device. The chatbot may have audio limitations when used in conjunction with the other sound generating device (e.g., when static, constant and/or dynamic background noises are present, including from home appliances and phones, among other things). As a result, the user may need to move closer to the chatbot to ensure effective communication; silence, mute, and/or lower the sound level impact of sound generating devices in close proximity to the chatbot; or raise the volume of the chatbot to be heard over the background noise(s).

Therefore, it may be advantageous to, among other things, dynamically monitor background noises (e.g., to control any noise generation features), dynamically communicate with sound generating device(s) within audio range of a chatbot, and learn user sound preferences (e.g., to dynamically manage a sound generating device within audio range of a chatbot).

According to at least one embodiment, the present invention may reduce audio interference from occurring during command requests of a chatbot device by a user.

The present invention may include dynamically monitoring environmental (e.g., background, Internet of Things (IoT) device, etc.) noises within a predefined threshold distance of a user and may alter audio generated by devices within the threshold distance, as necessary.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a sound management program 110a. The networked computer environment 100 may also include a server 112 that is enabled to run a sound management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The connected device 118 may include various devices including, but not limited to, a chatbot device or an Internet of Things (IoT) device. There may be more than one connected device 118 which may communicate with any other connected device(s) 118 and the computer network environment. The connected device 118 is depicted as shown as its own separate entity but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the sound management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the sound management program 110a, 110b (respectively) to detect audio interference with a chatbot device and alter the sound generating device producing the interfering audio, as necessary, and for as long as the audio interference exists. The sound management method is explained in more detail below with respect to FIG. 2.

Figure 2:
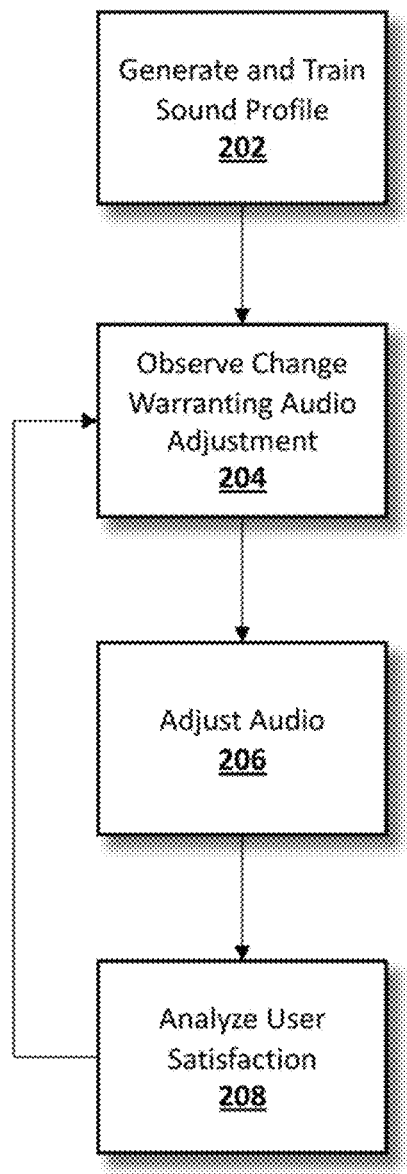
FIG. 2 is an operational flowchart illustrating a process for sound management according to at least one embodiment.

Referring now to FIG. 2, an operational flowchart illustrating the exemplary sound management process 200 used by the sound management program 110a and 110b according to at least one embodiment is depicted.

At 202, a sound profile is generated and trained. A sound profile may be generated by initializing at least one connected device (i.e., a connected sound generating device, sound generating device) using device credentials. A user may initialize at least one connected sound generating device via near field communications (NFC), Bluetooth® (Bluetooth and all Bluetooth-based trademarks and logos are trademarks or registered trademarks of Bluetooth SIG, Inc. and/or its affiliates), Wi-Fi, and/or any other form of machine-to-machine pairing communication. The sound profile may be part of the sound management program 110a, 110b.

A chatbot and audio and/or visual sensors (e.g., sensors which may be part of a multi-sensor environment to which the chatbot is connected, including as components of connected smart cameras, among other things) may also be part of the sound management program 110a, 110b.

Any device which may create a disturbance to the chatbot audio environment (e.g., a loudness and/or other interference at the chatbot interface device) and/or may have direct entry into the chatbot system may be included in the sound profile, and a user's distance to the device may be tracked. If, for example, based on pings to a connected device, the sound management program 110a, 110b determines that the user is within a predefined threshold of the device (i.e., the connected device), which distance may be reconfigurable by a user in the user's profile, then the sound management program 110a, 110b may make an audio adjustment of the device (e.g., in instances where the device is determined to be disruptive), as will be described in more detail below.

The sound management program 110a, 110b may learn a user's identity (e.g., for purposes of generating a sound profile) by registering user credentials using audio and/or visual facial recognition and/or by acquiring sensor data (e.g., via audio and/or visual sensors). The sound management program 110a, 110b may also learn the sounds generated by a multitude of connected devices. The aforementioned learning may include recording either the user's speech, or the sounds generated by a connected device, in order to capture features of the speech and/or other sounds using a Mel-frequency cepstral coefficient (MFCC) with a Gaussian mixture model (GMM). The sound management program 110a, 110b may be trained using the learned sounds to identify the user and/or the sound generating device.

Within the sound profile, a user may also define sound generating device preferences (i.e., connected sound generating device preferences). Sound generating device preferences may be defined directly into the system (e.g., by a user) or may be learned based on a user's actions (e.g., if the volume of a sound generating device is decreased during an observed mealtime, which the system can identify based on the use of connected audio and/or visual sensors, then same may become a defined sound generating device preference).

Sound generating device preferences may be established automatically in instances where the user does not have preestablished user credentials, by creating a set of user credentials based on learned preferences of the user, given observed actions taken by the user in instances of audio disturbance (e.g., in instances of audio conflict with the chatbot, does the user mute or lower the tv or stereo volume, pause the dishwasher, washing machine or dryer?). The sound management program 110a, 110b may also learn preferences based on the user's temporal conversational interaction with the chatbot as well as based on connected audio and/or visual sensors (e.g., sensors which may be part of a multi-sensor environment to which the chatbot is connected).

Feedback of the user (e.g., based on reinforcement learning) in the form of audio, visual, and/or textual feedback may be used to learn a user's preferences. Natural language processing (NLP) techniques, such as Watson™ (Watson and all Watson-based trademarks are trademarks or registered trademarks of International Business Machines Corporation in the United States, and/or other countries) techniques, may be used to take dialogues spoken by the user, for example, as feedback to teach the sound management program 110a, 110b to modify any surrounding sounds (e.g., by performing noise reduction, and pausing an operation of a sound generating device, among other things). For example, audio feedback may be gathered when a user reduces the volume of a television when no one is watching (e.g., which may be learned using audio and visual sensors), and textual feedback may be gathered when a user provides a written command to a connected smart device, for example, directing the device to be paused when a telephone call is underway (e.g., which may be learned using audio and/or visual sensors of the sound management program 110a, 110b).

A Markov Decision Process may be used in the reinforcement learning model to take into account a user's input (e.g., user feedback) in an action undertaken by the sound management program 110a, 110b and, in this case, to perform the action in such a way that provides an ameliorative output (e.g., to modify a sound generating device such that sounds generated by the device are in accordance with a user's preferences).

Visual sensors may be used to track a user using image recognition techniques, including but not limited to convolutional neural networks (CNN) and regional convolutional neural networks (R-CNN), which may be useful for object detection. A CNN may be architecturally comprised of separate and distinct layers, for example, a convolutional layer, a max pooling layer, and a fully connected layer. The visual sensors used to track the user may be embedded within smart cameras which may be triggered by the chatbot and/or may be automatically capturing the camera's surroundings.

The reinforcement learning model of the sound management program 110a, 110b may generate a multidimensional risk vector which relates to the observed sounds, including sounds of the user and any connected sound generating devices within close proximity (e.g., based on the predefined threshold) of the user. The generated multidimensional risk vector may be used for data processing (e.g., for determining that an audio adjustment is warranted and further performing the audio adjustment). Weights may be applied to input features of the multidimensional risk vector, as appropriate, based on observed preferences of a user.

The sound management program 110a, 110b may manage connected sound generating devices within audio range of the chatbot and may establish a hierarchy of sound dominance based on the factors described above (e.g., based on a temporal period, a regularly scheduled event, and/or a dynamic event). For example, a hierarchy of sound dominance may be established such that no noises may be made during family dinner except for the playing of classical music at a specified decibel, based on a specific user command or based on learned patterns of behavior. Audio and visual sensors, described above, may be used to determine when dinner is underway and to further learn the user's routines (e.g., how long the meal will typically take, what constitutes a meal as compared to casual dining and/or kitchen grazing).

The sound management program 110a, 110b may manage more than one sound generating profile for each user. At least one managed sound generating profile of a user may define group preferences (e.g., how to react when a defined group is identified in a room and/or a particular event is identified as being underway). Defined group preferences may include overriding sounds generated by nearby sound generating devices based on a priority event (e.g., the Super Bowl) taking place. A priority event may be defined by a user and/or may be suggested by the sound management program 110a, 110b based on a large number of other users defining the event as a priority.

At 204, a change is observed which warrants an audio adjustment. The chatbot may use audio, visual and/or near field communications (NFC) sensor(s) to identify one or more users within audio range of the chatbot and may make a modification to a sound generating device based on a preference of the identified user(s).

As described previously with respect to step 202 above, the sound management program 110a, 110b may monitor a user and/or users in a group as the user and/or users move in and out of audio range of the chatbot. Based on the monitoring of the user and/or users, and further based on sound generating device preferences included in the user and/or users' sound profile, the sound management program 110a, 110b may determine that an audio adjustment is warranted.

As a first example, a first user, User A, is doing housework with the dishwasher, washing machine and television (TV) on. User A's house has an open layout which includes a kitchen near the main living space. The home includes a chatbot which is configured to work with the sound management program 110a, 110b. The dishwasher, washing machine and TV are all also connected to the sound management program 110a, 110b using near field communications (NFC). As User A begins to converse with the chatbot, the connected sound management program 110a, 110b recognizes that User A is the sole user in the room and thus User A's sound profile preferences should govern. This will include adjusting the settings of the other sound generating devices (e.g., the dishwasher, washing machine, and TV) according to the settings detected in User A's sound profile.

As a second example, a second user, User B, and his spouse are doing housework and the dishwasher, washing machine, and TV on. User B's house has an open layout which includes a kitchen near the main living space. The home includes a chatbot which is configured to work with the sound management program 110a, 110b. The dishwasher, washing machine and TV are all also connected to the sound management program 110a, 110b using near field communications (NFC). A cell phone begins to ring within audio range of the chatbot. Based on the preferences included within User B's sound profile, the sound management program 110a, 110b determines that an audio adjustment of the connected sound generating devices is warranted.

As a third example, a third user, User C, and his family, are having a family dinner. The family has decided that family dinners are a special time and has accordingly configured a group preference in the sound management program 110a, 110b indicating that no interruptions should be permitted during this time. The sound management program 110a, 110b recognizes that the family is having a family dinner, using connected audio and visual sensors, as described previously with respect to step 202 above, and determines that an audio adjustment of the connected sound generating devices is warranted.

At 206, audio is adjusted. The sound management program 110a, 110b may dynamically adjust the audio generated by a connected sound generating device based on the preferences of a user or group of users within audio range of the chatbot. In instances where there is more than one chatbot connected to the sound management program 110a, 110b, and sound generating devices are identified near each of the connected chatbots, the sound management program 110a, 110b may combine all identified users within audio range of the connected chatbots into a single virtual group and may optimize the sound management program's 110a, 110b response to the combined group, adjusting the audio of all sound generating devices (e.g., all sound generating devices determined to be within audio range of all connected chatbots).

Dimensionality reduction may be performed as part of the audio adjustment. Using various methods of sound delivery, sounds may be specifically pointed in certain directions. Based on the gathered data, as described previously with respect to step 202 above, the sound management program 110a, 110b may have amassed a large dataset with sounds pointing in particular directions (e.g., when plotted on an x-y coordinate axis). The gathered sound data may be, for example, 15-dimensional data. A principal component analysis (PCA) may be used here to reduce the dimensionality by determining whether a correlation between features of data is close to 1. In this case, the closely correlated features may be combined (e.g., reduced in number). This may be a form of optimization which increases a response speed and lessens a training time by enabling faster processing based on a reduced number of features (e.g., features may include a user, a device, a type of device, a distance, and a location, among other things).

Continuing with the first example from step 204 above, the sound management program 110a, 110b will pause the functionality of the other sound generating devices (e.g., the dishwasher, washing machine, and TV) until User A's chatbot session has ended, at which time the devices may return to normal operation.

Continuing with the second example from step 204 above, the sound management program 110a, 110b mutes the washing machine and TV, but leaves on the dishwasher, based on a configured preference of User B.

Continuing with the third example from step 204 above, the sound management program 110a, 110b silences all sound generating devices within audio range of the chatbot.

At 208, a user's satisfaction is analyzed and further ameliorative action (e.g., an audio adjustment) may be performed. Reinforcement learning, as described previously with respect to step 202 above, may be used here to learn what a user likes and does not like. Learning of the user's preferences may be done over time based on an analysis of gathered audio and/or visual sensor data of the user, among other things. The analyzed user's satisfaction may be used to retrain the machine learning model (i.e., the reinforcement learning model), and may thus be fed back into the sound management program 110a, 110b.

Weighted factors (i.e., features) of the multidimensional risk vector may also be fed into a multi-layer neural network (e.g., a convolutional neural network (CNN)) using active feedback of the user. As described previously with respect to step 202 above, a CNN may be architecturally comprised of separate and distinct layers, for example, a convolutional layer, a max pooling layer, and a fully connected layer. Here, the CNN may involve different inputs relating to gathered audio and/or visual data, among other data, where each input parameter has an associated weight. A sound adjustment score may be generated (e.g., which may indicate a user's satisfaction and/or whether additional ameliorative action should be taken). The method for evaluating a sound adjustment score (e.g., based on the multidimensional risk vector) may be based on a plurality of reconfigurable weighted factors which determine an overall proficiency of the system, as described previously, and any weighted ameliorative actions that need to be taken based on an established rigidity factor (e.g., a level of confidence in identifying a particular pattern based on the set of weighted input vectors and/or features, with the inclusion of a user's feedback used as additional input to cross-verify a generated score).

It may be appreciated that FIG. 2 provide only an illustration of one embodiment and do not imply any limitations with regard to how different embodiments may be implemented. Many modifications to the depicted embodiment(s) may be made based on design and implementation requirements.

Figure 3:
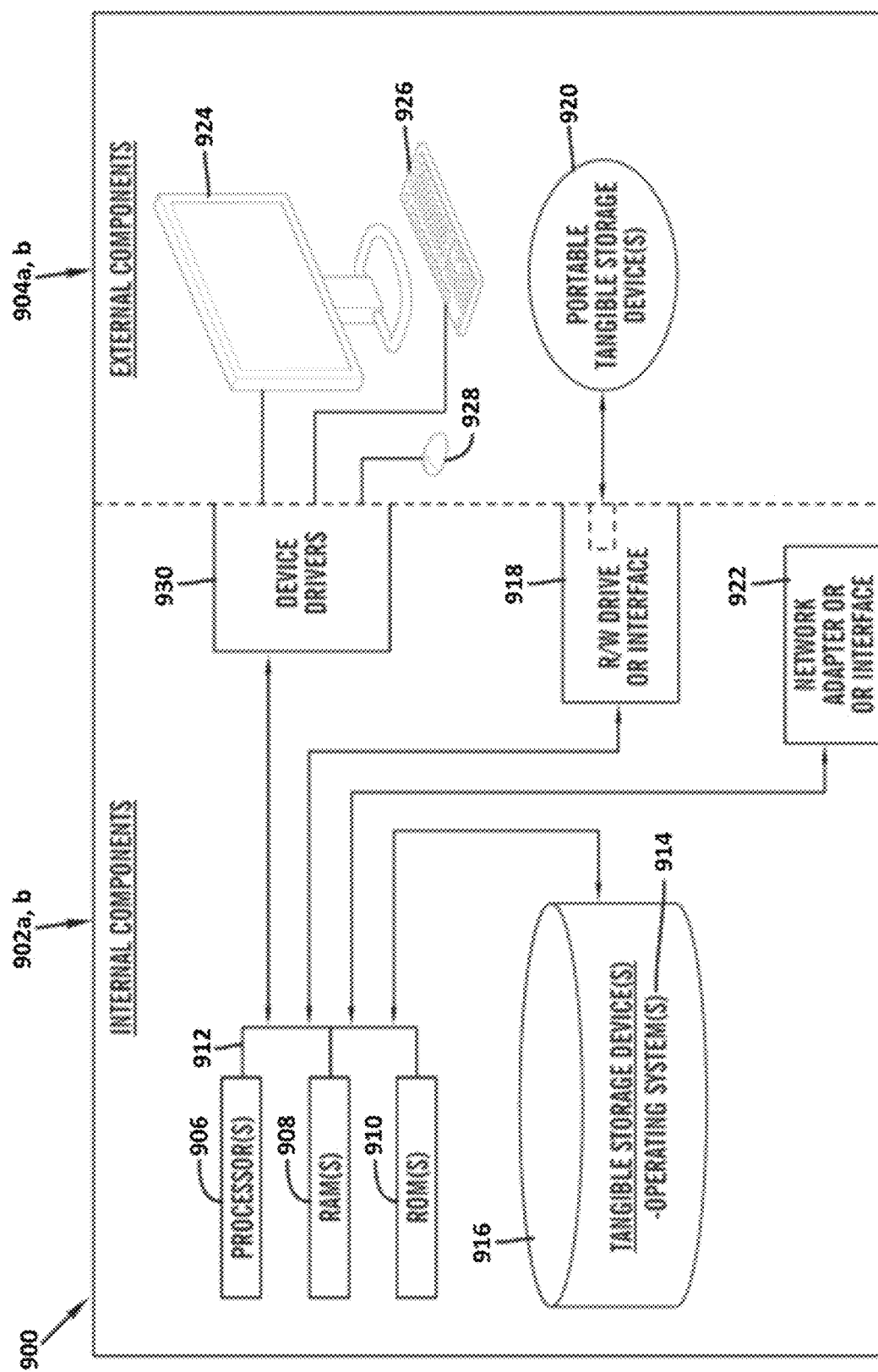
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904 a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the sound management program 110a in client computer 102, and the sound management program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the sound management program 110a and 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the sound management program 110a in client computer 102 and the sound management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the sound management program 110a in client computer 102 and the sound management program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902*a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
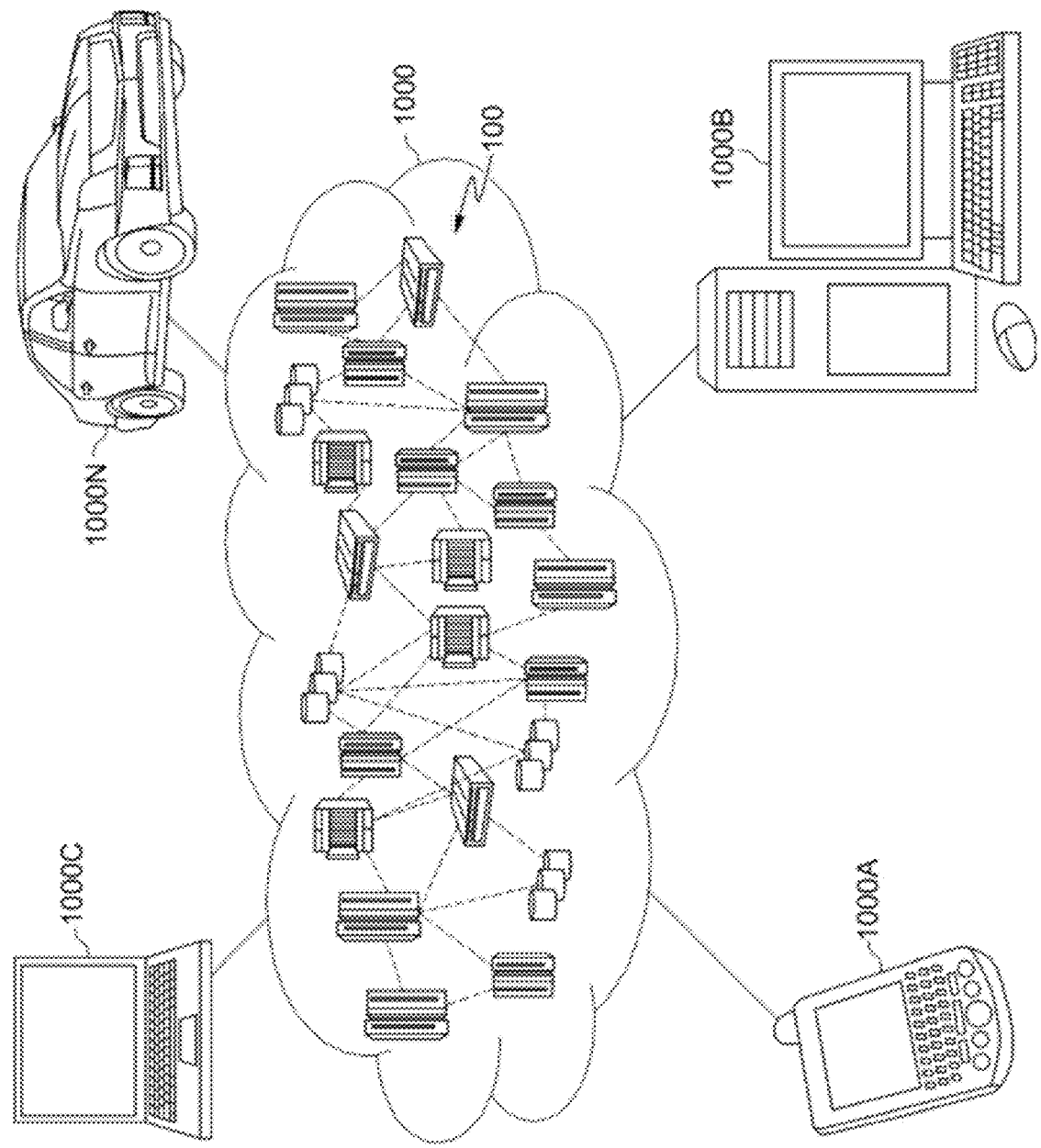
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
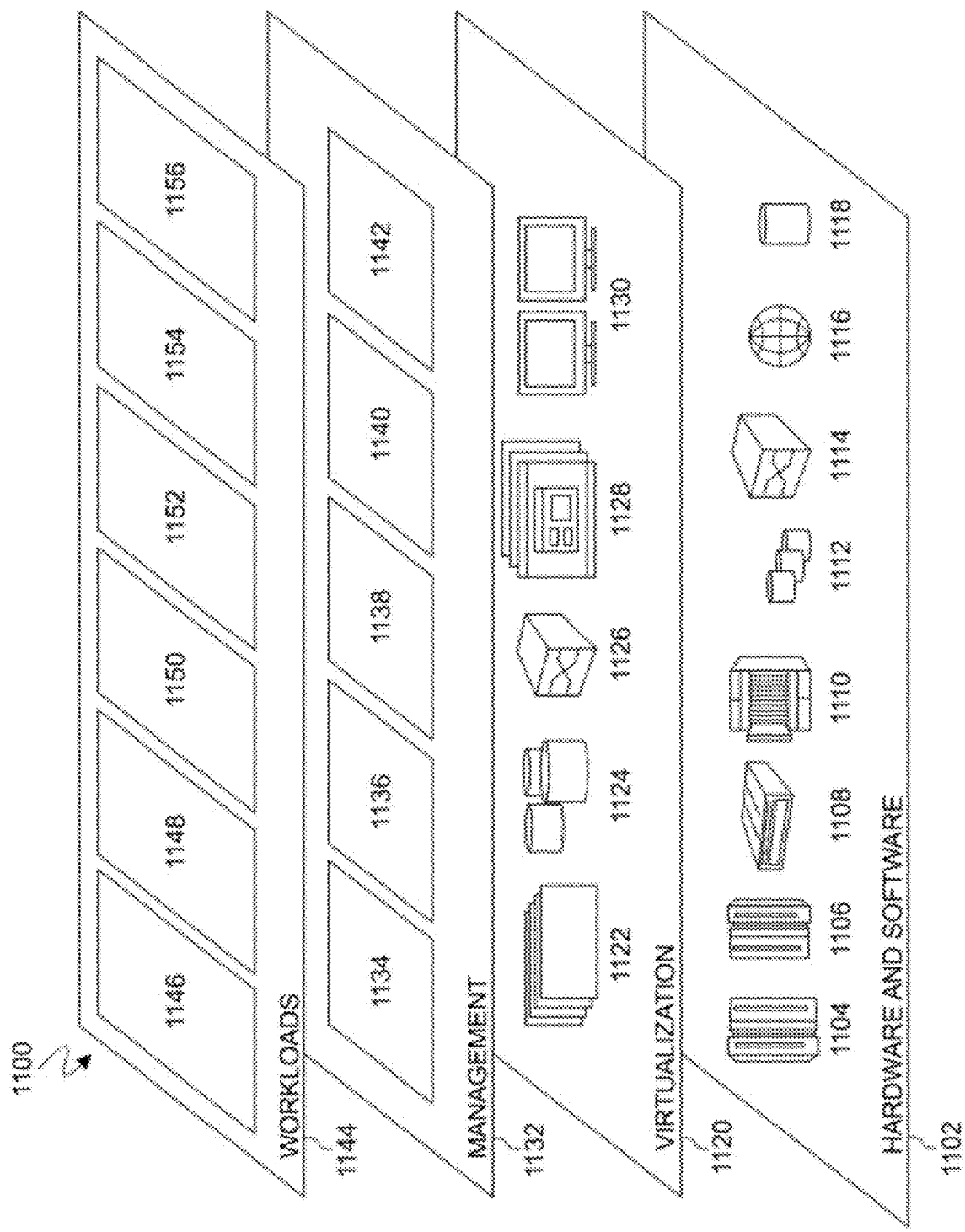
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and sound management 1156. A sound management program 110a, 110b provides a way to detect audio interference with a chatbot device and alter the sound generating device producing the interfering audio, as necessary, and for as long as the audio interference exists.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sound management, the method comprising:
   generating a multidimensional risk vector relating to a current contextual activity of a user;
   dynamically tracking a distance between a chatbot of the user and a plurality of sound generating devices, wherein the plurality of sound generating devices comprise a sound profile;
   determining, based on the tracking, that at least one of the plurality of sound generating devices is within a predefined threshold distance of the chatbot of the user; and
   responsive to determining that an audio adjustment of the at least one sound generating device of the plurality of devices is warranted based on the multidimensional risk vectors and a hierarchy of sound dominance, wherein the hierarchy of sound dominance is based on at least one group preference or at least one user preference, performing the audio adjustment; and
   training a machine learning model to classify a plurality of user feedback, wherein the machine learning model is a convolutional neural network which ingests at least one weighted feature of the multidimensional risk vector, wherein natural language processing is used as part of a classification process by interpreting a dialogue spoken by the user, and wherein the audio adjustment is performed based on the classified plurality of user feedback.

2. The method of claim 1, wherein audio, visual, and near field sensors are used to identify the user and the current contextual activity of the user.

3. The method of claim 1, further comprising:
   defining the at least one group preference based on a specified temporal event.

4. The method of claim 1, further comprising:
   learning the at least one user preference based on data gathered by audio, visual, and near field sensors.

5. The method of claim 1, further comprising:
   managing more than one sound profile for the user, wherein each sound profile includes at least one sound generating device within audio range of the chatbot of the user.

6. The method of claim 1, further comprising:
   creating, in instances where there is more than one user within audio range of the chatbot, a virtual group to optimize a response to the sound generating device; and
   performing dimensionality reduction of the generated multidimensional risk vector based on a principal component analysis (PCA).

7. A computer system for sound management, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
      generating a multidimensional risk vector relating to a current contextual activity of a user;
      dynamically tracking a distance between a chatbot of the user and a plurality of sound generating devices, wherein the plurality of sound generating devices comprise a sound profile;

determining, based on the tracking, that at least one of the plurality of sound generating devices is within a predefined threshold distance of the chatbot of the user; and responsive to determining that an audio adjustment of the at least one sound generating device of the plurality of devices is warranted based on the multidimensional risk vectors and a hierarchy of sound dominance, wherein the hierarchy of sound dominance is based on at least one group preference or at least one user preference, performing the audio adjustment; and training a machine learning model to classify a plurality of user feedback, wherein the machine learning model is a convolutional neural network which ingests at least one weighted feature of the multidimensional risk vector, wherein natural language processing is used as part of a classification process by interpreting a dialogue spoken by the user, and wherein the audio adjustment is performed based on the classified plurality of user feedback.

8. The computer system of claim 7, wherein audio, visual, and near field sensors are used to identify the user and the current contextual activity of the user.

9. The computer system of claim 7, further comprising: defining the at least one group preference based on a specified temporal event.

10. The computer system of claim 7, further comprising: learning the at least one user preference based on data gathered by audio, visual, and near field sensors.

11. The computer system of claim 7, further comprising: managing more than one sound profile for the user, wherein each sound profile includes at least one sound generating device within audio range of the chatbot of the user.

12. The computer system of claim 7, further comprising:
creating, in instances where there is more than one user within audio range of the chatbot, a virtual group to optimize a response to the sound generating device; and
performing dimensionality reduction of the generated multidimensional risk vector based on a principal component analysis (PCA).

13. A computer program product for sound management, comprising:
one or more non-transitory computer-readable storage media and program instructions stored on at least one of the one or more tangible storage media, the program instructions executable by a processor to cause the processor to perform a method comprising:
generating a multidimensional risk vector relating to a current contextual activity of a user;

dynamically tracking a distance between a chatbot of the user and a plurality of sound generating devices, wherein the plurality of sound generating devices comprise a sound profile;

determining, based on the tracking, that at least one of the plurality of sound generating devices is within a predefined threshold distance of the chatbot of the user; and responsive to determining that an audio adjustment of the at least one sound generating device of the plurality of devices is warranted based on the multidimensional risk vectors and a hierarchy of sound dominance, wherein the hierarchy of sound dominance is based on at least one group preference or at least one user preference, performing the audio adjustment; and training a machine learning model to classify a plurality of user feedback, wherein the machine learning model is a convolutional neural network which ingests at least one weighted feature of the multidimensional risk vector, wherein natural language processing is used as part of a classification process by interpreting a dialogue spoken by the user, and wherein the audio adjustment is performed based on the classified plurality of user feedback.

14. The computer program product of claim 13, wherein audio, visual, and near field sensors are used to identify the user and the current contextual activity of the user.

15. The computer program product of claim 13, further comprising:
defining the at least one group preference based on a specified temporal event.

16. The computer program product of claim 13, further comprising:
learning the at least one user preference based on data gathered by audio, visual, and near field sensors.

17. The computer program product of claim 13, further comprising:
managing more than one sound profile for the user, wherein each sound profile includes at least one sound generating device within audio range of the chatbot of the user.

18. The computer program product of claim 13, further comprising:
creating, in instances where there is more than one user within audio range of the chatbot, a virtual group to optimize a response to the sound generating device; and
performing dimensionality reduction of the generated multidimensional risk vector based on a principal component analysis (PCA).

* * * * *